United States Patent
Ohlendorf et al.

(10) Patent No.: US 11,743,750 B2
(45) Date of Patent: Aug. 29, 2023

(54) MEASURING DEVICE AND METHOD FOR TESTING CSI TYPE II CODEBOOK COMPLIANCE

(71) Applicant: Rohde & Schwarz GmbH & Co. KG, Munich (DE)

(72) Inventors: Rainer Ohlendorf, Muensing (DE); Niels Petrovic, Munich (DE); Lisa Ward, Columbia, MD (US)

(73) Assignee: Rohde & Schwarz GmbH & Co. KG, Munich (DE)

(*) Notice: Subject to any disclaimer, the term of this patent is extended or adjusted under 35 U.S.C. 154(b) by 78 days.

(21) Appl. No.: 17/075,404

(22) Filed: Oct. 20, 2020

(65) Prior Publication Data
US 2022/0124525 A1    Apr. 21, 2022

(51) Int. Cl.
*H04W 24/08*    (2009.01)
*H04W 76/10*    (2018.01)
*H04B 7/0456*    (2017.01)
*H04B 7/06*    (2006.01)

(52) U.S. Cl.
CPC .......... *H04W 24/08* (2013.01); *H04W 76/10* (2018.02); *H04B 7/0456* (2013.01); *H04B 7/0626* (2013.01)

(58) Field of Classification Search
CPC .. H04W 24/08; H04L 43/026; H04L 43/0858; H04L 43/0864; H04L 41/5009; H04L 2212/00
See application file for complete search history.

(56) References Cited

U.S. PATENT DOCUMENTS

| | | | |
|---|---|---|---|
| 10,263,681 B2* | 4/2019 | Noh | H04B 7/0626 |
| 2014/0334391 A1* | 11/2014 | Khoshnevis | H04W 72/0413 |
| | | | 370/329 |
| 2018/0278315 A1* | 9/2018 | Wu | H04B 7/0632 |
| 2019/0068267 A1* | 2/2019 | Rahman | H04B 7/0626 |
| 2019/0081678 A1 | 3/2019 | Park et al. | |
| 2019/0109626 A1 | 4/2019 | Park et al. | |
| 2019/0181929 A1* | 6/2019 | Ge | H04B 7/0632 |
| 2019/0319739 A1 | 10/2019 | Kang et al. | |
| 2019/0379503 A1 | 12/2019 | Kang et al. | |
| 2020/0015228 A1 | 1/2020 | Kang et al. | |
| 2020/0036424 A1 | 1/2020 | Kweon et al. | |
| 2020/0099435 A1 | 3/2020 | Kang et al. | |
| 2020/0177254 A1 | 6/2020 | Lee et al. | |
| 2020/0178220 A1 | 6/2020 | Kang et al. | |
| 2020/0178223 A1 | 6/2020 | Kang et al. | |
| 2020/0204239 A1 | 6/2020 | Kang et al. | |
| 2020/0412422 A1* | 12/2020 | Park | H04B 7/0473 |
| 2021/0306041 A1* | 9/2021 | Gao | H04B 7/0478 |
| 2021/0367652 A1* | 11/2021 | Wernersson | H04B 7/0634 |

FOREIGN PATENT DOCUMENTS

| | | | |
|---|---|---|---|
| WO | 2016164073 A1 | 10/2016 | |
| WO | 2018226581 A1 | 12/2018 | |

* cited by examiner

*Primary Examiner* — Hassan Kizou
*Assistant Examiner* — Hector Reyes
(74) *Attorney, Agent, or Firm* — Ditthavong, Steiner & Mlotkowski

(57) ABSTRACT

A measuring device for testing channel state information, CSI, type II codebook compliance of a 5G NR compliant device under test is provided. The measuring device is configured to establish a communication connection to the device under test, and send a codebook subset restriction command to a device under test. The codebook subset restriction command instructs the device under test to exclude all CSI type I precoders.

8 Claims, 4 Drawing Sheets

MEASURING DEVICE AND METHOD FOR TESTING CSI TYPE II CODEBOOK COMPLIANCE

TECHNICAL FIELD

The invention relates to performing measurements on communication devices, for example communication devices according to the 5G NR (new radio) communication standard.

5G NR (New Radio) is a new radio access technology specified in the 3GPP specification 38 series (see www.3gpp.org), the disclosure of which is hereby incorporated by reference.

Especially, the present invention relates to determining if the 5G NR device under test is CSI type II codebook compliant.

BACKGROUND ART

Communication devices according to the new radio communications standard allow for the use of single user multiple input multiple output, SU-MIMO and multiple user multiple input multiple output, MU-MIMO transmissions. Such communication devices are for example shown by the document US 2020/015228 AA.

During a communications connection between such a mobile communication device and a base station the mobile communication device reports channel state information, CSI, back to the base station. This CSI is reported in the form of a precoding matrix indicator, PMI. This PMI indicates to the base station, which precoding matrix to use for transmitting and receiving by the base station, with regard to the mobile communication device, using a plurality of transmission antennas.

Different types of CSI are defined by the new radio communication standard: type I, type II. In order to test if a mobile communication device is implemented according to the standard, type I CSI and type II CSI needs to be verified.

A 5G NR standard-conform mobile communication device uses a type II CSI feedback in presence of at least a second user generating interference. Otherwise, it might use type I CSI feedback. When attempting to implement a test procedure for type II CSI feedback, a great hardware effort for providing the simulation of an interfering further user is therefore usually necessary.

Accordingly, there is a need to provide a measuring device, a measuring system and a testing method, which allow for a testing of channel state information type II codebook compliance of a device under test, while keeping the requirements on the hardware low.

SUMMARY OF THE INVENTION

According to a first aspect of the invention, a measuring device for testing channel state information, CSI, type II codebook compliance of a 5G NR compliant device under test is provided. The measuring device is configured to establish a communication connection to the device under test and send a codebook subset restriction command to said device under test. The codebook subset restriction command instructs the 5G NR compliant device under test to exclude all CSI type I precoders. When precoders of type I are excluded, the device under test has to use CSI type II codebook precoders, independent of the presence of a further interfering test user. Therefore, it is not necessary to implement the simulation of an interfering second user. This significantly reduces the hardware effort for testing CSI type II codebook compliance.

According to a first implementation form, the measuring device is further configured to, after transmitting the codebook subset restriction command to the device under test, determine if a reported precoding matrix indicator, PMI of the device under test is CSI type II codebook compliant, determine a CSI type II codebook compliance of the device under test, if the reported PMI is determined as CSI type II codebook compliant, and to determine a CSI type II codebook non-compliance of the device under test, if the reported PMI is determined as CSI type II codebook non-compliant. This allows for a very simple determining of the CSI type II codebook compliance of the device under test.

According to a second implementation form, the measuring device is further configured to, after transmitting the codebook subset restriction command to the device under test, transmit a first test signal to the device under test, using a preset or random precoding matrix indicator, PMI. Such a test signal results in the device under test responding with a reported CSI, from which the CSI type II codebook compliance can be determined.

According to a third implementation form, the measuring device is further configured to, after transmitting the first test signal to the device under test, receive a reported PMI from the device under test. This allows for determining of the CSI type II codebook compliance, while requiring only minimal hardware effort.

According to a fourth implementation form, the measuring device is further configured to, after receiving the reported PMI from the device under test, determined if the reported PMI is CSI type II codebook compliant, determine a CSI type II codebook of the device under test, if the reported PMI is determined as CSI type II codebook compliant, and determine a CSI type II codebook non-compliance of the device under test, if the reported PMI is determined as CSI type II codebook non-compliant. This allows for an especially simple implementation.

According to a fifth implementation form, the measuring device is further configured to determine a first downlink performance of the device under test when using the preset or random PMI and determine a second downlink performance of the device under test, when using the reported PMI. Moreover, the device is configured to determine a downlink performance difference between the first downlink performance and the second downlink performance. The measuring device is furthermore configured to determine a CSI type II codebook compliance of the device under test, if the determined downlink performance difference is above a preset or configurable difference threshold, and determine a CSI type II codebook non-compliance of the device under test, if the determined downlink performance difference is below the difference threshold. This alternative or even additional process of determining CSI type II codebook compliance further increases the accuracy of the testing, while not significantly increasing the required hardware effort.

According to a sixth implementation form of the present invention, the measuring device is configured to not perform a multiple user multiple input multiple output, MU-MIMO, measurement on the device under test. Additionally or alternatively, the measuring device is configured to not transmit an interference signal to the device under test, while performing measurements. This ensures that a very low hardware effort is generated.

According to a seventh implementation form of the present invention, wherein the measuring device is configured to establish, for the testing, a wirebound or a wireless ("over the air (OTA) measurement") communication connection to the 5G NR device under test.

According to a second aspect of the invention, a measuring system is provided. The inventive measuring system comprises a measuring device according to any of the preceding claims and a 5G NR compliant device under test. This allows for an especially simple implementation.

According to a third aspect of the invention, a testing method for testing channel state information, CSI type II codebook compliance of a 5G NR compliant device under test is provided. The method comprises the following steps: establishing a communication connection between a measuring device and the device under test, and sending a codebook subset restriction command to the device under test, by the measuring device, wherein the codebook subset restriction command instructs the device under test to exclude all CSI type I precoders. This allows for a very simple implementation of the method.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
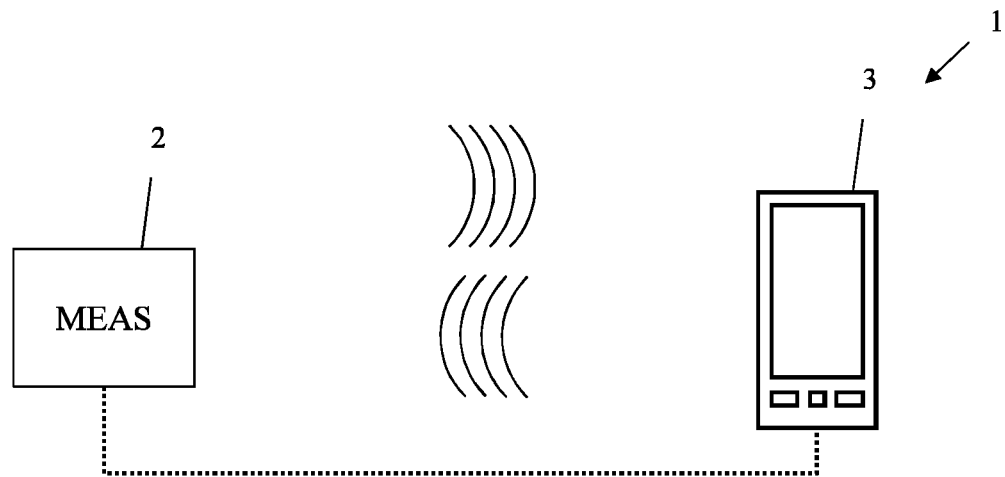
FIG. 1 shows a first embodiment of the inventive measuring device and measuring system in a block diagram.
Figure 4:
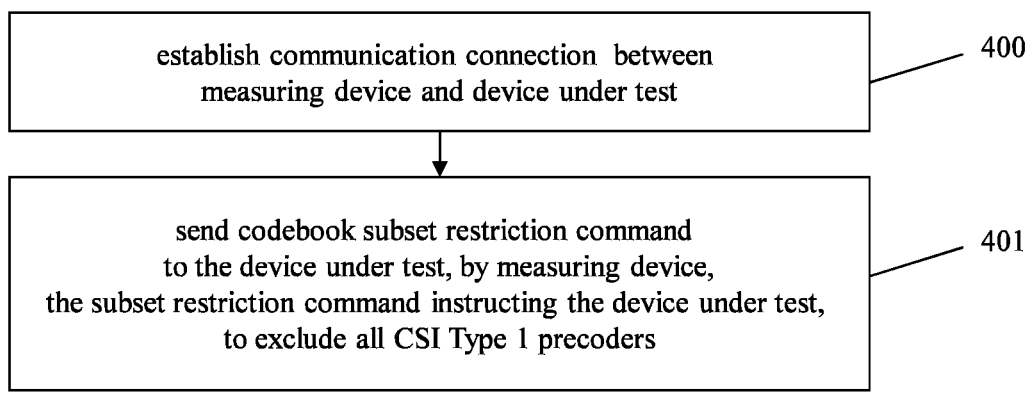
FIG. 4 shows a first embodiment of the inventive method in a flow diagram.
Figure 5:
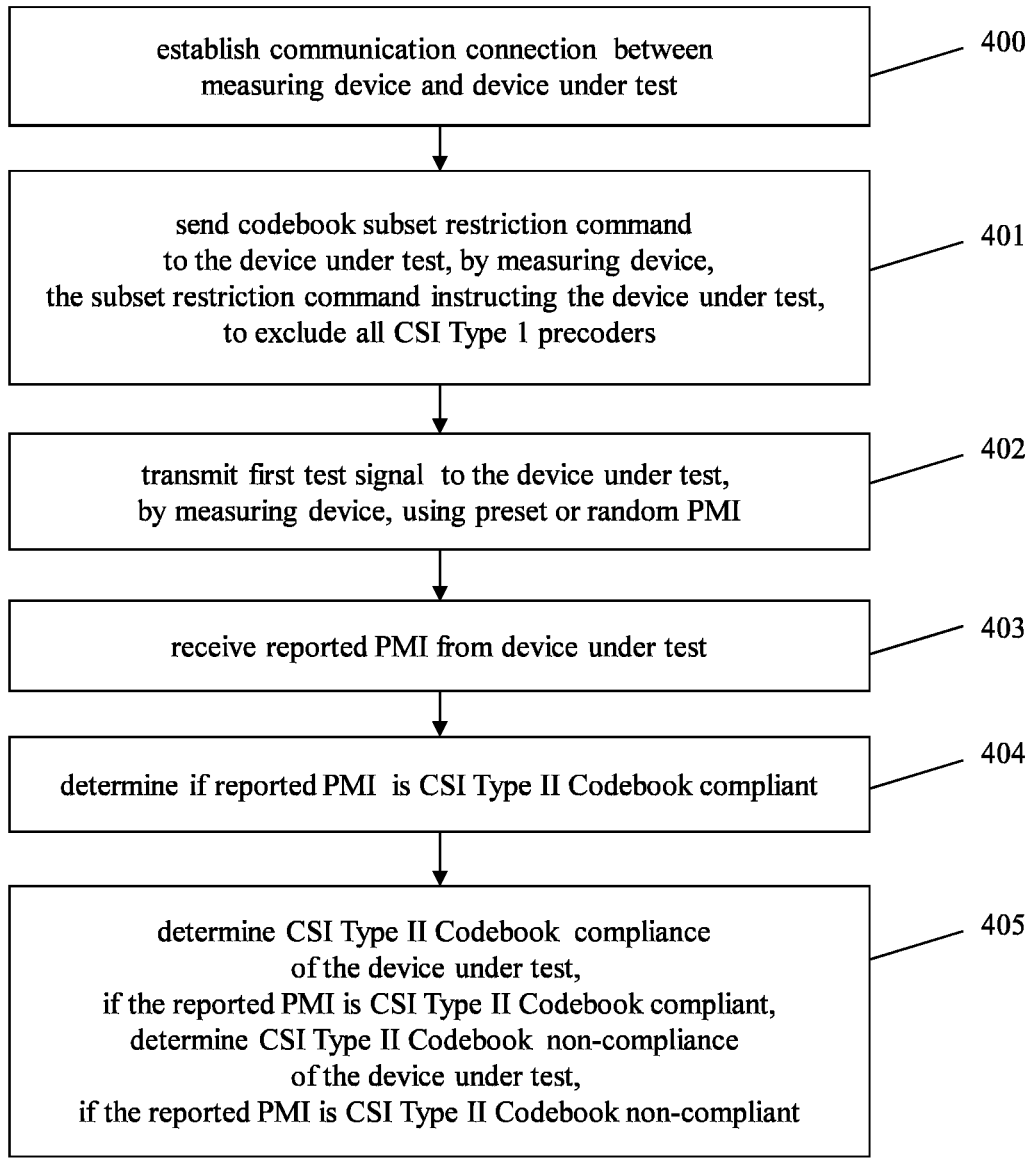
FIG. 5 shows a second embodiment of the inventive method in a flow diagram.

First, we demonstrate the general construction and function of an inventive measuring system and measuring device along FIG. 1. The inner construction of an embodiment of the inventive measuring device is shown and described along FIG. 2. With regard to FIG. 3, a sequence of messages exchange between an embodiment of the inventive measuring device and the device under test is shown. Finally, FIG. 4 and FIG. 5 show different embodiments of the inventive testing method. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the inventive measuring system 1 is shown. The measuring system comprises a measuring device 2 and a device under test 3. The device under test 3 therein is for example a mobile communication device according to the new radio standard.

The measuring device 2 and the device under test 3 are connected through a wireless connection. Additionally or alternatively, the measuring device 2 and the device under test 3 may be connected through a wired connection.

In case of an additional connection through a wired connection, control commands for setting up the device under test 3 in a measuring mode may be transmitted through the wired connection, while the actual test procedure happens through the wireless connection.

If only connected through either the wireless connection or through the wired connection, both the test setup as well as the actual testing are performed through the respective connection.

Second Embodiment

Figure 2:
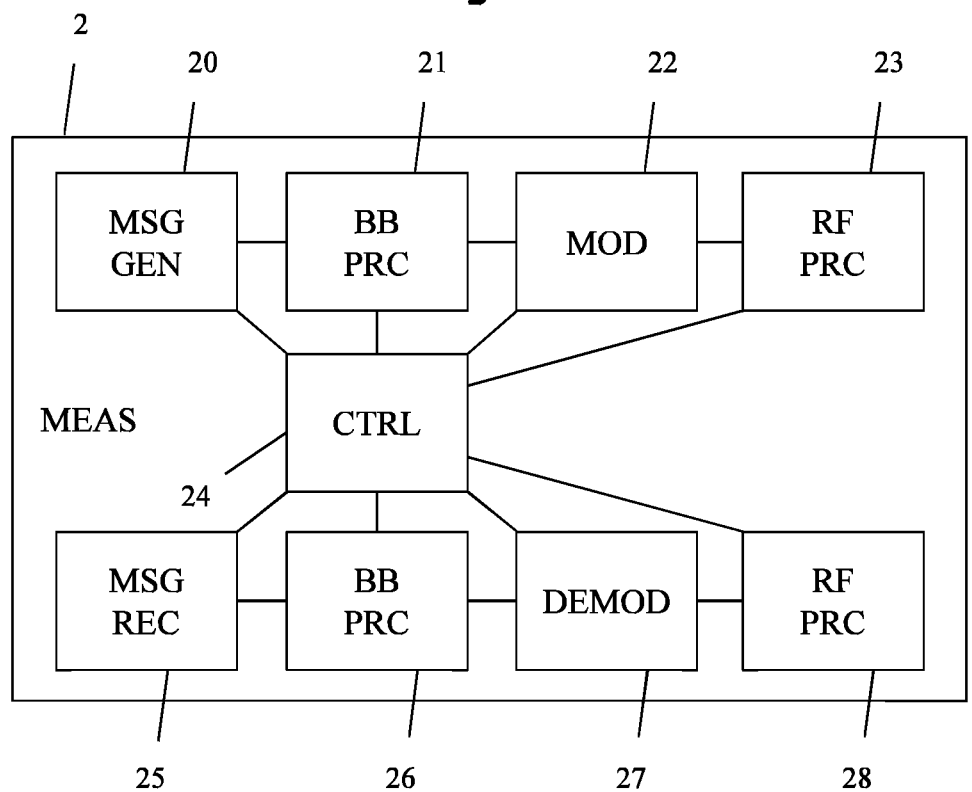
FIG. 2 shows a second embodiment of the inventive measuring device in a detailed block diagram.

In FIG. 2, an embodiment of the inventive measuring device 2 is shown. Here, an exemplary internal construction of the measuring device 2 is shown. The measuring device 2 comprises a message generator 20 connected to a baseband processor 21, which is connected to a modulator 22, which in turn is connected to a radio frequency processor 23. Moreover, the measuring device 2 comprises a radio frequency processor 28, which is connected to a demodulator 27, which in turn is connected to a baseband processor 26, which again is connected to a message receiver 25.

All of the components 20-23 and 25-28 are connected to a controller 24. The controller 24 controls the function of the individual components connected to it.

For generating a transmission, the message generator 20 generates a digital message to be transmitted and hands it to the baseband processor 21. The baseband processor 21 generates an according baseband signal therefrom, and hands it to the modulator 22. The modulator 22 modulates the baseband signal to a radio frequency signal and hands it to the radio frequency processor 23, which performs radio frequency processing thereupon. For example, the radio frequency processor performs a filtering and/or an equalization.

For receiving a transmission, the radio frequency processor 28 receives the radio frequency signal and performs a radio frequency processing thereupon. This comprises for example a filtering and/or an equalization. The processed radio frequency signal is handed to the demodulator 27, which demodulates it and generates a baseband signal therefrom. This baseband signal is handed to the baseband processor 26, which performs baseband processing thereupon. Especially, the baseband processor 26 generates a digital signal from the baseband signal. This signal is handed on to the message receiver 25, which determines an actual digital message from the digital signal.

It should be noted that the elements shown here are suitable for a communication through the wireless interface as well as through the wired interface. In case of the use of the wireless interface, a respective transmission and reception antenna, not shown here, is additionally connected to the radio frequency processors 23, 28. In case of the use of the wired interface, a respective cable connection, which is also not shown here, would connect to the radio frequency processors 23, 28. In case of a wired connection only for control signals, this connection could originate at the controller 24 and be directly connected to the device under test 3.

Third Embodiment

Figure 3:
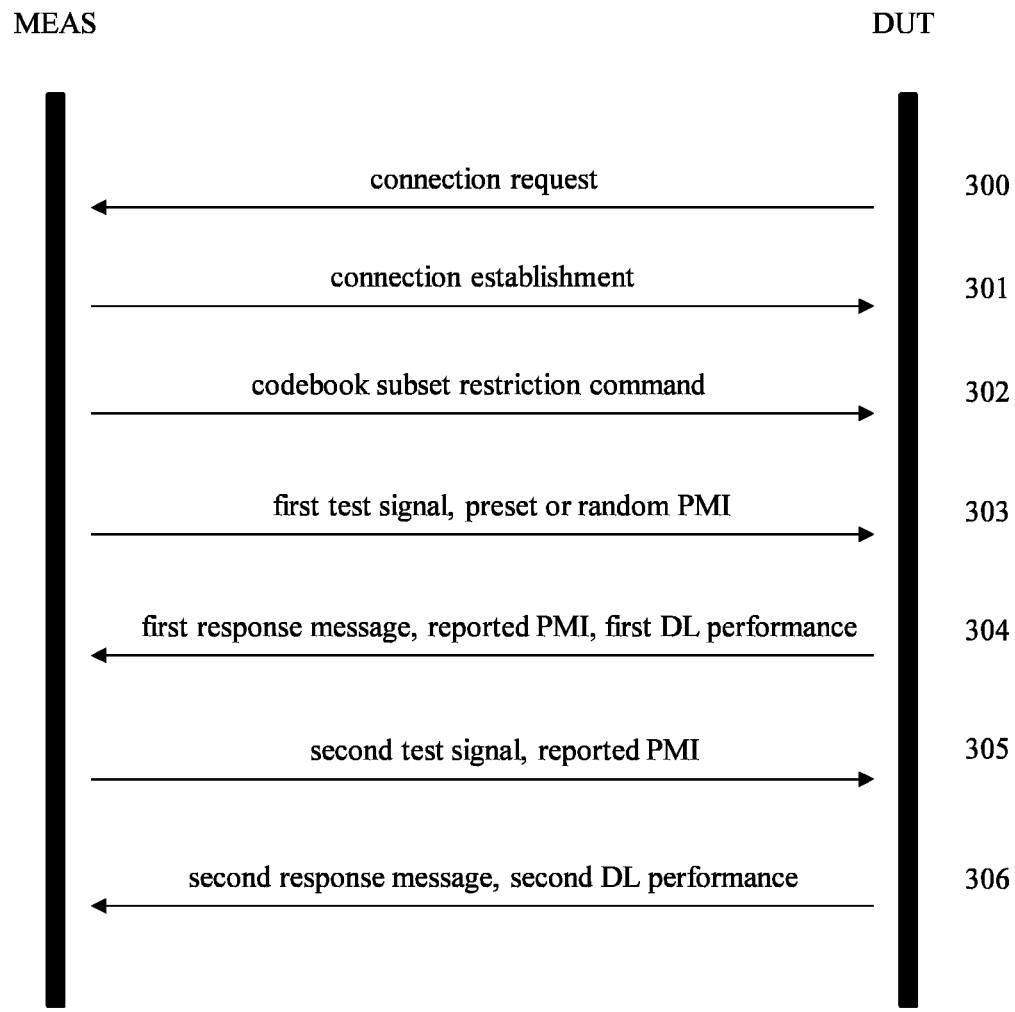
FIG. 3 shows a signal flowchart of exemplary signals used by a second embodiment of the inventive measuring system.

In FIG. 3, a sequence of messages between an embodiment of the inventive measuring device and the device under test is shown. As a first message, the device under test transmits a connection request 300 to the measuring device. As a second message, the measuring device transmits a connection establishment message 301 to the device under test. By these two messages, a communication connection between the measuring device and the device under test is established.

The measuring device then transmits a codebook subset restriction command 302 to the device under test. The device under test reacts upon this by excluding all CSI type I precoders from further processing. This means that the device under test cannot use CSI type I precoding matrix indicators for reporting the channel state.

After this, the measuring device transmits a first test signal using a preset or random precoding matrix indicator, PMI to the device under test in a fourth message 303. This prompts the device under test to answer with a first response message, including a reported PMI in a fifth message 304. Since the device under test cannot use the CSI type I precoders, it has to use CSI type II precoders for reporting the CSI. Also in this message, the downlink performance using the preset or random PMI of the first test signal is reported.

In a sixth message 305, the measuring device then transmits a second test signal using the reported PMI to the device under test. This signal is received by the device under test. The device under test reacts by transmitting a seventh message 306. Especially, this message is a second response message, reporting the second downlink performance that was determined when receiving the second test signal using the reported PMI.

From the first downlink performance and the second downlink performance, as well as from the adherence of the reported PMI to CSI type II codebook standards, it can then be determined by the measuring device if the device under test is CSI type II codebook compliant.

Fourth Embodiment

In FIG. 4, a simple implementation of the inventive method is shown in a flow diagram. In a first step 400, a communication connection is established between the measuring device and the device under test. In a second step 401, a codebook subset restriction command is sent by a measuring device to the device under test. The subset restriction command instructs the device under test to exclude all CSI type I precoders.

Fifth Embodiment

In FIG. 5, a further, more elaborate embodiment of the inventive method is shown. The steps 400 and 401 are identical to FIG. 4.

In a third step 402, a first test signal is transmitted to the device under test by the measuring device. It uses a preset or random PMI. In a fourth step 403, a PMI reported by the device under test as a reaction to the first test signal is received by the measuring device. In a fifth step 404, it is determined if the PMI is CSI type II codebook compliant. In a final sixth step 405, it is determined that the device under test is CSI type II codebook compliant, if the reported PMI is CSI type II codebook compliant, and that the device under test is not CSI type II codebook compliant if the PMI is not.

Additionally, the CSI type II compliance can be tested based upon the downlink performance. For this purpose, a first downlink performance when using the preset or random PMI is determined. Moreover, a second downlink performance is determined when the reported PMI is used. A downlink performance difference is determined from the first downlink performance and the second downlink performance. This downlink difference may be compared to a threshold. If the threshold is exceeded by the downlink performance difference, this is a strong indicator for CSI type II codebook compliance, while it is a strong indicator against, if the threshold is not exceeded.

The exceeding of the threshold by the downlink performance difference can be used as an alternative or additional criterion for determining the CSI type II codebook compliance. When using both the downlink performance as well as the PMI CSI type II codebook compliance, a CSI type II codebook compliance of the device under test may for example only be determined if both the reported PMI is CSI type II codebook compliant as well as the downlink performance difference exceeding the threshold. Alternatively the CSI type II codebook compliance might already be assumed, if one of the two criteria is met.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like, which perform the features or operations described above. Software code can be stored in a memory unit so that it can be executed by a processor. The memory unit may be located inside or outside the processor and can communicate date with the processor through a variety of known means.

The invention is not limited to the examples, and especially not to a specific communication standard or type of device under test. The invention discussed above can be applied to many communications standards, as well as to many different devices under test, for example, cellphones, tablets, radio devices, internet of things applications, device-to-device communications, etc. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

The invention claimed is:

1. A measuring device for testing channel state information, CSI, Type II Codebook compliance of a 5G NR compliant device under test, the measuring device comprising at least one processor configured to:
   establish a communication connection to the device under test, and
   send a codebook subset restriction command to the device under test, wherein the codebook subset restriction command instructs the device under test, to exclude all CSI Type I precoders,
   after transmitting the codebook subset restriction command to the device under test, transmit a first test signal to the device under test, using a preset or random PMI,
   after transmitting the first test signal to the device under test, receive a reported PMI from the device under test,
   determine a first downlink performance of the device under test, when using the preset or random PMI, determine a second downlink performance of the device under test, when using the reported PMI.

2. The measuring device according to claim 1, further configured to, after transmitting the codebook subset restriction command to the device under test,
    determine if a reported precoding matrix indicator, PMI of the device under test is CSI Type II Codebook compliant,
    determine a CSI Type II Codebook compliance of the device under test, if the reported PMI is determined as CSI Type II Codebook compliant, and
    determine a CSI Type II Codebook non-compliance of the device under test, if the reported PMI is determined as CSI Type II Codebook non-compliant.

3. The measuring device according to claim 1, further configured to, after receiving the reported PMI from the device under test,
    determine if the reported PMI is CSI Type II Codebook compliant,
    determine a CSI Type II Codebook compliance of the device under test, if the reported PMI is determined as CSI Type II Codebook compliant, and
    determine a CSI Type II Codebook non-compliance of the device under test, if the reported PMI is determined as CSI Type II Codebook non-compliant.

4. The measuring device according to claim 1, further configured to,
    determine a downlink performance difference between the first downlink performance and the second downlink performance,
    determine a CSI Type II Codebook compliance of the device under test, if the determined downlink performance difference is above a preset or configurable difference threshold, and
    determine a CSI Type II Codebook non-compliance of the device under test, if the determined downlink performance difference is below the difference threshold.

5. The measuring device of claim 1, further configured to:
    not perform a multiple user multiple input multiple output, MU-MIMO, measurement on the device under test, and/or,
    not transmit an interference signal to the device under test, while performing measurements.

6. The measuring device of claim 1,
    wherein the measuring device is configured to
    establish, for the testing, a wirebound or a wireless communication connection to the 5G NR device under test.

7. A communication testing system comprising a measuring device according to any of the preceding claims and a 5G NR compliant device under test.

8. A testing method, for testing channel state information, CSI, Type II Codebook compliance of a 5G NR compliant device under test, comprising the following steps:
    establishing a communication connection between a measuring device and the device under test, and
    sending a codebook subset restriction command to the device under test, by the measuring device, wherein the codebook subset restriction command instructs the device under test to exclude all CSI Type I precoders,
    testing the CSI Type II Codebook compliance of the device under test,
    after transmitting the codebook subset restriction command to the device under test, transmitting a first test signal to the device under test, using a preset or random PMI,
    after transmitting the first test signal to the device under test, receiving a reported PMI from the device under test
    determining a first downlink performance of the device under test, when using the preset or random PMI,
    determining a second downlink performance of the device under test, when using the reported PMI.

* * * * *